Patented May 28, 1929.

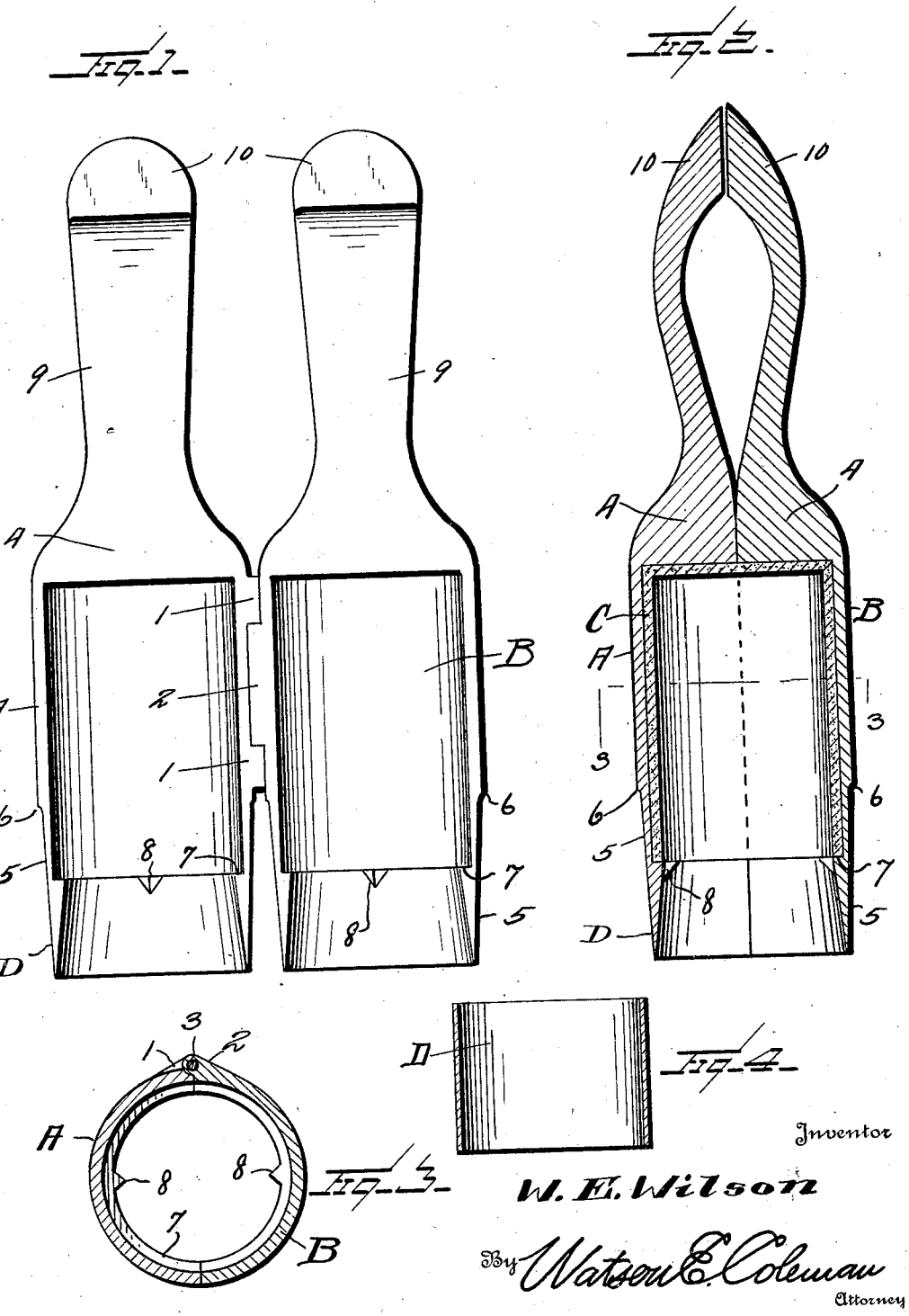

1,714,834

UNITED STATES PATENT OFFICE.

WALTER E. WILSON, OF GRAND JUNCTION, COLORADO, ASSIGNOR TO KICK PRODUCTS CORPORATION, OF GRAND JUNCTION, COLORADO, A CORPORATION OF COLORADO.

CONFECTION IMPLEMENT.

Application filed March 26, 1927. Serial No. 178,759.

This invention relates to a device to facilitate a confection implement and it is an object of the invention to provide a device of this kind to effect loading or filling of a container with ice cream or kindred material.

It is also an object of the invention to provide an implement of this kind adapted to receive and hold a container of paper, pastry, confection material of any kind suitable to the purpose and which is adapted to be inserted within ice cream or kindred material in bulk to fill or load the container while held by the implement.

Another object of the invention is to provide an implement of this kind provided with means whereby the ice cream or kindred material may be readily severed or cut to facilitate the ready withdrawal of the implement when the container is filled or loaded, said means also serving to retain the content within the container and to cut into the periphery of the content of the container as it enters therein to provide means to permit escape of air during the time of filling or loading.

An additional object of the invention is to provide an implement of this kind having means for limiting the extent of insertion of the implement within the bulk of ice cream or other material from which the container carried by the implement is to be filled or loaded and in a manner whereby several insertions are required to obtain a complete fill or load, thus conserving the ice cream or the like in bulk against rapid deterioration from air attack as would be liable to occur if the implement dug deep wells in the bulk material.

The invention consists in the details of construction and in the combination and arrangement of the several parts of my improved confection implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation of an implement constructed in accordance with an embodiment of my invention with the channel members in separated relation;

Figure 2 is a sectional view taken lengthwise of the implement as herein disclosed with the members in closed relation and a receptacle housed therein;

Figure 3 is a sectional view taken substantially on the line 3—3 of Figure 2 with the receptacle omitted;

Figure 4 is a view partly in section and partly in elevation illustrating a block adapted to be employed in connection with the implement.

As herein disclosed, my improved implement comprises two channel members A and B of substantially duplicate construction except that a longitudinal marginal portion of the member A is provided with a pair of spaced knuckles 1 between which is received a single knuckle 2 carried by the second member B, said knuckles having disposed therethrough a pintle member 3 whereby the members A and B are hinged together for relative swinging movement and in a manner, when closed, they form a hollow cylinder or chamber.

The outer end portion of each of the members A and B is open but the opposite end portion is closed by a head or plate 4. When the members are in closed relation the longitudinal margins thereof and the free margins of the plates 4 abut.

The outer end portions of the members A and B have their walls reduced in thickness, as at 5, resulting in circumferentially disposed shoulders 6 spaced from the outer or free ends of the members A and B a distance, in the present embodiment of my invention, of about one-third the length of said members or more particularly the channels thereof. The outer faces of these portions 5 are beveled inwardly toward the free ends of the members, while the free end portion of each of the members A and B, or more particularly the portions 5 thereof, is defined by an internal flange 7 tapered toward the outer or free end portion of each member. The portions of the members A and B outwardly of flanges 7 constitute what may be termed die portions D of the implement and it is to be noted that said flanges, when the members A and B are closed, provide a die portion of an interior diameter less than that of the inner or major portions of the closed members.

In the present embodiment of my invention, the flanges 7 at diametrically opposed points and adjacent their inner margins are provided with the inwardly disposed lugs 8 preferably sharp edged and tapered from their rear to their forward portions for a purpose to be hereinafter more particularly referred to.

Extending outwardly from the plates 4 of the members A and B are the elongated handle members 9 terminating in inwardly disposed extensions 10 adapted to abut when the members A and B are in closed relation. These handles 9 provide means whereby the members A and B may be readily opened or closed by the user.

In practice, the members A and B are swung into open position in order to permit replacement therebetween of a desired container C to be loaded or filled and said container being disposed inwardly of the flanges 7 and which flanges hold such container against displacement when the members A and B are in closed relation. The handles 9 are grasped by the user to assure the members A and B being effectively maintained in closed position and the open end of said closed members is forced into a bulk of ice cream or kindred material to a depth as determined by the shoulders 6 which determines the limit to which the implement should penetrate the material at any one operation. In the present embodiment of my invention, this operation is repeated three times in order to completely fill or load the container C. It is to be noted that the bevel of the portions 5 and the flanges 7 provide sharp entering or cutting edges for the implement.

When the implement is inserted within the bulk of material the implement is given a slight turn and the lugs 8 cut or sever the portion or pillar of ice cream or kindred material which has entered the container and when the implement is withdrawn these lugs further operate to hold the content of the container from falling out. As the implement is forced within the bulk of ice cream or the like these lugs also operate to cut grooves in the periphery of the pillar of material entering the container and thereby provide means to permit the escape of air from the interior of the closed members A and B inwardly of the content or pillar of ice cream or the like received within the container.

It is also to be noted that the shoulders 6 hereinbefore referred to are positioned below the knuckles 1 and 2, thus eliminating the liability of the lower knuckle 1 coming in contact with the bulk ice cream or the like.

By filling the container as a result of a plurality of insertions within the bulk material or by definitely determining the depth to which the implement is to be inserted, the bulk material is conserved against more rapid deterioration through air attack. In other words, there is eliminated deep wells being dug in the bulk material that would cause a greater surface to be opened to the air and thus result in deterioration at a more rapid rate.

It is to be understood that the members A and B may be made of such size and dimensions to be used in connection with the filling or loading of containers of pint, quart or other capacity and by the insertion of a cylindrical block or member D between the members A and B inwardly of an applied container, the space unoccupied by the container may be completely filled.

It is also to be noted that the flanges 7 extend inwardly of the members A and B a distance sufficient to permit ice cream or the like to pass through the die portion as particularly afforded by these flanges without striking an adjacent edge of the applied container C.

From the foregoing description it is thought to be obvious that a confection implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A filler for cylindrical cartons, comprising a pair of semi-cylindrical trough-like bodies each closed at one end and open at the other, each of said bodies having a gauge shoulder formed around the outer face and tapering from the shoulder to the adjacent edge and each body having a carton edge supporting shoulder formed about the inner face and tapered from this shoulder to the adjacent edge, a hinge connection between two contacting edges of the bodies positioned inwardly of the open ends from the gauge shoulders, and a handle extending longitudinally of each body from the closed end, said handles assuming a side by side position upon bringing the edges of the body together, the distance longitudinally of the bodies between the gauge shoulder and the carton edge supporting shoulder bearing a definite relation to a carton of standard size designed to fit in and between the bodies.

2. In combination with a cylindrical carton filling device comprising a pair of semi-cylindrical bodies having hinge connection at adjacent edges for swinging the bodies apart to permit the insertion of a carton, said bodies being closed at one end and open at the other end, of a block member designed to be positioned in the filler inwardly of the open end thereof to adapt the same to cartons of a size smaller than a standard size which the filler is constructed to receive.

In testimony whereof I hereunto affix my signature.

WALTER E. WILSON.